United States Patent [19]

Tolley

[11] 4,119,697

[45] Oct. 10, 1978

[54] PRODUCTION OF TITANIUM METAL VALUES

[75] Inventor: William K. Tolley, Arlington Heights, Ill.

[73] Assignee: UOP Inc., Des Plaines, Ill.

[21] Appl. No.: 814,506

[22] Filed: Jul. 11, 1977

[51] Int. Cl.² ............................................. C01G 23/06
[52] U.S. Cl. ........................................ 423/82; 423/85
[58] Field of Search ..................... 423/49, 82, 83, 85, 423/86, 611, 612, 150, 141

[56] References Cited

U.S. PATENT DOCUMENTS

| 2,113,946 | 4/1938 | Plechner | 423/612 |
| 2,296,423 | 9/1942 | Clark | 423/141 |
| 3,894,139 | 7/1975 | Cardwell | 423/150 |
| 3,903,239 | 9/1975 | Berkovich | 423/82 |

Primary Examiner—Brian Hearn
Attorney, Agent, or Firm—James R. Hoatson, Jr.; Raymond H. Nelson; William H. Page, II

[57] ABSTRACT

Titanium metal values may be recovered from a titanium bearing source by subjecting the titanium bearing source to a reductive roast followed by leaching the reduced source with a hydrogen chloride source. Thereafter the leached titanium bearing source is precipitated by contact with a metal oxide such as ferric oxide in which the metal is present in a highly oxidized state. The precipitated titanium dioxide is separated and recovered while the spent liquor is treated to form hydrogen chloride which may be recycled to the leaching zone with a simultaneous formation of the metal oxide for recycle to the precipitation zone.

13 Claims, 1 Drawing Figure

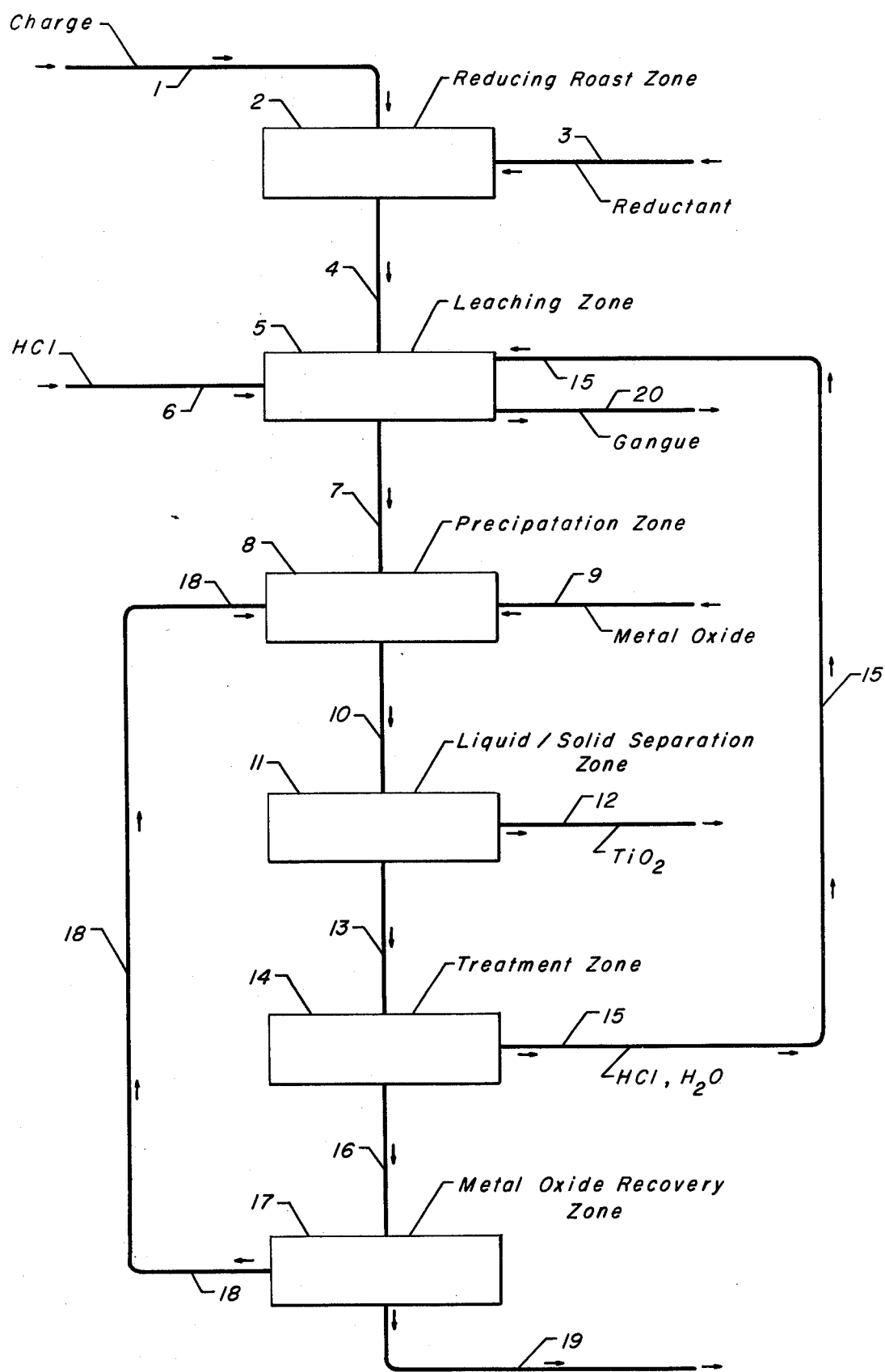

PRODUCTION OF TITANIUM METAL VALUES

BACKGROUND OF THE INVENTION

Titanium in metallic form or as a compound is an important element in the chemical series. For example, titanium dioxide is utilized in paint pigments, in white rubbers and plastics, floor coverings, glassware and ceramics, painting inks, as an opacifying agent in papers, etc. The other titanium compounds are used in electronics, as fire retardants, waterproofing agents, etc. The metal may be used as such or in alloy form as structural material in aircraft, in jet engines, marine equipment, textile machinery, surgical instruments, orthopedic appliances, sporting equipment, food handling equipment, etc. Heretofore in recovering the titanium from titanium bearing sources such as ilmenite, rutile, etc., the titanium has been subjected to separation steps which involve the formation of titanium as a compound in a valence state of +4, such compounds usually involving titanium oxide. However, when attempting to separate titanium dioxide from impurities which are also contained in the ore such as iron, the hydrolysis of the titanium dioxide at elevated temperatures usually results in also obtaining relatively large amounts of iron along with the titanium.

Heretofore in the prior art various methods have been utilized to recover titanium values from titanium bearing sources. For example, in U.S. Pat. No. 3,236,596 an unroasted ilmenite ore is leached with hydrogen chloride at an elevated temperature. Following this, dissolved iron is reduced with iron or other reductants to precipitate ferrous chloride by saturating the liquor with hydrogen chloride gas. The hydrogen chloride is then extracted from the liquor by a vacuum distillation and the titanium is recovered by conventional means. Likewise, U.S. Pat. No. 3,825,419 reduces an ilmenite ore to produce ferrous oxides. The reduced ore is then leached for about 4 hours under a moderate pressure thereby dissolving the iron in the acid along with about 15% of the titanium. The iron is recovered as ferric oxide containing impurities in the spray roaster while the insoluble product which is primarily titanium dioxide but which contains all of the silica present in the original ore is recovered. U.S. Pat. No. 3,859,077 also discloses a process for recovering titanium in which a titanium tetrahalide is mixed with iron oxide in slag or a titaniferous ore at an extremely high temperature of about 1000° C. to produce volatile impurity chlorides and titanium dioxide. A similar patent, U.S. Pat. No. 3,929,962, also reduces a titanium bearing ore at a high temperature to produce titanium sesquioxide which is in a form whereby it is easier to treat for a titanium-iron separation. Another prior art reference, U.S. Pat. No. 3,903,239 teaches a method for recovering titanium in which unroasted ilmenite is leached over a period of days at room temperature to recover about 80% of the titanium. Sulfur dioxide is added during the leaching to cause a precipitation of the ferrous chloride after which titanium dioxide is recovered by diluting and heating the solution.

In contradistinction to these prior art methods of recovering titanium values from a titanium bearing source, I have now found that it is possible to produce a titanium dioxide by reaction with ferric oxide whereby the process will possess several advantages over the present technology. These advantages will hereinafter be set forth in greater detail.

This invention relates to a process for obtaining titanium metal values from a titanium bearing source. More specifically the invention is concerned with a process for recovering titanium from a titanium bearing source such as ilmenite whereby a greater amount of titanium is obtained from the separation. The advantages of utilizing the process of the present invention are found in the fact that the reactions are effected in a relatively short period of time, for example, the leaching of the titanium ore which has been reduced can be effected during a period of from about 0.25 to about 0.5 hours and the precipitation of the desired titanium dioxide may be effected in a period as low as 0.1 hour. In addition, another advantage which is present when utilizing the process of the present invention is that the reactions may, if so desired, be effected at atmospheric pressure thus obviating the use of relatively expensive and complicated equipment. In addition to the aforesaid advantages, it is possible to obtain a desired yield of titanium metal values using relatively low grade ores as the starting material. Other advantages which are present in the present process are that the leach solution possesses an excellent stability at relatively high temperatures due to the high reducing potential of the solutions which are employed; the recovery of the titanium dioxide as rutile is effected at temperatures less than the boiling point of the solution with a high purity of the desired product; the acid need not be diluted to precipitate the titanium dioxide, thus decreasing the demand for water.

It is therefore an object of this invention to provide an improved process for the production of titanium metal values.

A further object of this invention is to provide a hydrometallurgical process for obtaining high yields of titanium metal values from titanium bearing sources.

In one aspect an embodiment of this invention resides in a process for the recovery of titanium values from a titanium bearing source which comprises subjecting said titanium bearing source to a reductive roast, thereafter leaching the reduced source with a hydrogen chloride source in a leaching zone, precipitating the leached titanium bearing source in a precipitation zone by contact with a metal oxide in which the metal is present in a highly oxidized state, separating and recovering the resultant precipitated titanium dioxide, treating the spent liquor to form and recycle hydrogen chloride to said leaching zone, and simultaneously forming the metal oxide for recycle to said precipitation zone.

A specific embodiment of this invention is found in a process for the recovery of titanium values from a titanium bearing source such as ilmenite which comprises subjecting said ilmenite to a reductive roast at a temperature in the range of from about 650° to about 1000° C., thereafter leaching the reduced source with hydrochloric acid in a leaching zone at a temperature in the range of from about 85° to about 105° C., precipitating the leached titanium bearing source in a precipitation zone by contact with ferric oxide at a temperature in the range of from about 75° to about 105° C., separating and recovering the resultant precipitated titanium dioxide, treating the spent liquor to form and recycle hydrochloric acid to said leaching zone and simultaneously forming ferric oxide for recycle to said precipitation zone.

Other objects and embodiments will be found in the following further detailed description of the present invention.

As hereinbefore set forth the present invention is concerned with an improved process for obtaining titanium metal values from a titanium bearing source such as ores including ilmenite, rutile, etc. By utilizing the present process it is possible to obtain a high yield of the desired product while utilizing relatively inexpensive equipment and also starting with a low grade ore. The process is effected by subjecting a titanium bearing source which also contains other metals, preferably iron, as well as vanadium, chromium, manganese, etc., to a reductive roast at an elevated temperature which will range from about 650° to about 1000° C. or more, said reductive roast being effected in the presence of a reductant such as hydrogen, carbon monoxide, combination of carbon monoxide and hydrogen, etc., or any other suitable reductant. In the preferred embodiment, the reductive roast is effected on a metal bearing source such as an ore which has been crushed to a particle size less than about 100 mesh for a period of time ranging from about 0.5 up to about 2 hours or more. In the preferred embodiment of the invention the reducing atmosphere which is used to accomplish the purpose of the roast usually comprises a mixture of about 50% carbon monoxide and 50% hydrogen with an excess of the reductant being utilized in order to completely reduce the iron which is present in the system to the metal. Following the reductive roast of the metal bearing source, the source is then subjected to an aqueous hydrogen chloride leach which is also effected at elevated temperatures usually in the range of from about 85° to about 105° C. for a period of time ranging from about 0.25 up to about 1 hour or more in duration. The aqueous hydrogen chloride solution which may also be characterized as hydrochloric acid will contain from about 20% up to about 37% hydrogen chloride. Upon completion of the leach step, the leached solution is thereafter treated with a metal oxide in which the metal portion of the oxide is present in a highly oxidized state. Some examples of these metal oxides which may be used to precipitate the titanium will include ferric oxide, vanadium pentoxide, vanadium dioxide, chromic oxide, manganese dioxide, cupric oxide, etc. The precipitated titanium dioxide is thereafter separated from the spent liquor and recovered while the aforesaid spent liquor is then treated to simultaneously form hydrogen chloride which is recycled to the leaching zone and the metal oxide which may then be recycled to the precipitation zone or recovered. In the preferred embodiment of the invention the metal oxide may be recycled to the precipitation zone in an amount ranging from about 50% to about 100% by weight of the titanium bearing source, the remainder being recovered for subsequent sale as metal oxide. In the preferred embodiment of the invention the treatment of the spent liquor is effected in a spray drying apparatus wherein the liquor is heated to a temperature ranging from about 300° up to about 950° C. in an oxidizing atmosphere provided for by either air, oxygen or a mixture of air and oxygen.

BRIEF DESCRIPTION OF THE DRAWING

The present invention will be further illustrated with reference to the accompanying drawing which sets forth a flow diagram of the process of the invention. It is to be understood that various valves, pumps, etc., have been eliminated as not being essential to the complete understanding of the present invention. However, the utilization of these, as well as other similar appurtenances, will become obvious as the drawing is described.

In the process a titanium bearing source such as ilmenite which has been crushed to the desired mesh value is charged through line 1 to a ruducing roast zone 2. In this apparatus the ore source is subjected to a reductive roast at a temperature in the range hereinbefore set forth in the presence of a reductant which may comprise a mixture of hydrogen and carbon monoxide gas, the reductant being charged to a reducing roast zone 2 through line 3. After undergoing the reductive roast for a period of time which is predetermined in length, the titanium bearing source or ore is withdrawn from reducing roast zone 2 through line 4 and passed to leaching zone 5. In this leaching zone, the ore is subjected to the action of a hydrogen chloride source, a portion of which may be introduced through line 6. The leaching step is effected at an elevated temperature ranging from about 85° to about 105° C. for a predetermined period of time sufficient to convert the metals to the corresponding chlorides. Thereafter the leached solution is withdrawn from leaching zone 5 through line 7 and passed to precipitation zone 8, while the gangue which has formed during the leaching step is separated and withdrawn through line 20. In precipitation zone 8, the solution is treated at a temperature ranging from about 75° to about 105° C. by contact with a metal oxide in which the metal portion of the compound is present in a highly oxidized state. A portion of this metal oxide which is utilized to precipitate the titanium is charged to line 9 to precipitation zone 8. After precipitation of the titanium as titanium dioxide, the pregnant leach liquor is withdrawn from precipitation zone 8 through line 10 and passed to a liquid/solids separation zone 11. In this zone the solid titanium dioxide is separated from the spent leach liquor and passed to storage through line 12 while the aforesaid spent leach liquor is withdrawn through line 13 and passed to treatment zone 14. In treatment zone 14 the spent leach liquor is treated in a manner similar to that set forth above whereby a simultaneous formation of aqueous hydrogen chloride and metal oxide is effected. The aforesaid aqueous hydrogen chloride is withdrawn from treatment zone 14 through line 15 and recycled to leaching zone 5 to act as a portion of the leach compound while the solid metal oxide is withdrawn from treatment zone 14 through line 16 and passed to metal oxide recovery zone 17. In this zone the metal oxide in which the metal portion of the compound is present in a highly oxidized state is separated, a portion of the metal oxide being withdrawn through line 18 for recycle back to precipitation zone 8 while any portion of the metal oxide which is not utilized as the precipitating agent is withdrawn through line 19 and passed to storage.

While the aforesaid description is indicative of a batch type operation, it is also possible to effect the process using a continuous method of operation in which the charge stock comprising crushed ore is continuously fed to a reducing roast zone wherein the charge is subjected to a reductive roast utilizing a reductant comprising either hydrogen, carbon monoxide or a combination thereof which is also continuously charged to this zone. After passage through the zone for a predetermined period of time, the reduced charge stock is continuously withdrawn and passed to a leaching zone wherein it is subjected to leach treatment with a hydrogen chloride source such as hydrochloric acid. The leaching zone is maintained at an elevated temperature and after passage through this zone the leach liquor containing dissolved metal chloride is continuously withdrawn and passed to a precipitation zone wherein the leach liquor is treated with a metal oxide, the metal portion of the compound being in a highly oxidized state. After treatment in the precipitation zone for a predetermined period of time, the solution containing precipitated titanium dioxide is continuously withdrawn from this zone and passed to a liquid/solid separation zone. The liquid/solid separation zone may comprise a centrifuge or a filtration apparatus whereby the spent leach liquor is continuously withdrawn and passed to a treatment zone while the desired titanium dioxide is continuously removed therefrom and passed to storage. After treatment in an oxidizing atmosphere whereby there is a simultaneous formation of hydrogen chloride in aqueous form and metal oxide, the latter is continuously recycled to the precipitation zone while the hydrogen chloride is continuously recycled to the leaching zone.

The following examples are given for purposes of illustrating the process of this invention. However, it is to be understood that said examples are given merely for purposes of illustration and that the present process is not necessarily limited thereto.

EXAMPLE I

An ilmenite ore was crushed to −100 mesh and a 200 gram sample was heated to a temperature of 750° C. under nitrogen in a rotating quartz furnace tube. Following this, hydrogen and carbon monoxide gas are each passed through the tube at a rate of 640 cm$^3$/minute for a period of 1 hour while maintaining the temperature of the tube at 750° C. At the end of this 1-hour period, the tube and sample contained therein were cooled under nitrogen to room temperature. Thereafter 50 grams of the reduced ilmenite ore were mixed with 300 ml of concentrated hydrochloric acid and heated to a temperature of 100° C. The solids were leached for a period of 120 minutes under reflux and then filtered. The leached solids after washing and drying weighed 2.18 grams and after analysis were found to contain 8.9% titanium and 5.2% iron. The leached liquor in an amount of 280 ml was analyzed and found to contain 40 grams/liter of titanium, 55 grams/liter of iron and 0.45 grams/liter of vanadium. A 100 ml sample of this liquor was cooled to room temperature to recover a large portion of the iron as ferrous chloride. About 90 ml of the remaining solution was then heated to 100° C. and 13.0 grams of powdered ferric oxide was added. The reaction was allowed to proceed for a period of 1 hour following which the solids were filtered, washed and dried to yield 7 grams of rutile containing 0.70% iron and no vanadium. The solution in an amount of 79 ml was analyzed and found to contain 0.48 grams/liter of titanium. This amounted to an approximate 99% of titanium in a +3 valence state to a titanium dioxide conversion.

EXAMPLE II

To illustrate the point that a dilute solution of hydrochloric acid may be used, 50 grams of ilmenite which had been reductively roasted in a manner similar to that set forth in Example I above was mixed with 220 ml of concentrated hydrochloric acid and 80 ml of water. The mixture was heated to 100° C. and leached for 15 minutes under refluxing. The slurry was filtered to yield 285 ml of leach liquor, analysis of which disclosed the presence of 33 grams/liter of titanium, 53 grams/liter of iron and 0.37 grams/liter of vanadium. The 5.24 grams of solid were found to contain 19% titanium, 25% iron and less than 0.04% vanadium. A 100 ml portion of the liquor was heated to 100° C. following which 12.3 grams of powdered ferric oxide were added. The reagents were agitated for a period of 1 hour at 100° C. before filtering. The reaction yielded 87 ml of spent liquor containing 0.28 grams/liter of titanium, 165 grams/liter of iron and 0.34 grams/liter of vanadium. The solids comprised 6.38 grams of titanium dioxide containing 2.0% iron and 0% vanadium. This amounted to a 91% extraction of titanium along with a 99+% conversion of titanium in a +3 valence state to titanium dioxide.

EXAMPLE III

In this example ilmenite from Kragaro Telemark, Norway was heated to a temperature of 750° C. and reduced for a period of 1 hour using 320 mg/minute each of hydrogen and carbon monoxide per 100 grams of ilmenite. After reduction, the solids were analyzed and found to contain 31% titanium. A 50 gram sample of this reduced ilmenite was admixed with 300 ml of concentrated hydrochloric acid and heated to a temperature of 100° C. The solids were leached for a period of 15 minutes at 100° C. following which they were filtered, washed and dried. The dried solids, weighing 14.2 grams, were analyzed as 27% titanium while the solution which had a volume of 243 ml contained 34 grams/liter of titanium. A 100 ml sample of the solution was heated to 85° C. and 10.3 grams of powdered ferric oxide was added. The reaction was allowed to proceed for a period of 5 minutes before filtering off the powder. After washing and drying the solid weighed 5.36 grams. The remaining solution in an amount of 88 ml was found to contain 6.2 grams/liter of titanium. This gives an approximate 70% extraction of titanium and an 84% conversion of the dissolved titanium to titanium dioxide.

I claim as my invention:

1. A process for the recovery of titanium values from a titanium bearing source which comprises subjecting said titanium bearing source to a reductive roast, thereafter leaching the reduced source with a hydrogen chloride source in a leaching zone, precipitating the leached titanium bearing source in a precipitation zone by contact at a temperature of from about 75° to about 105° C. with a metal oxide selected from the group consisting of ferric oxide, vanadium pentoxide, vanadium dioxide, chromic oxide, manganese dioxide, and cupric oxide, separating and recovering the resultant precipitated titanium dioxide, treating the spent liquor to form hydrogen chloride and recycling the latter to said leaching zone, and simultaneously forming the metal oxide and recycling thus formed metal oxide to said precipitation zone.

2. The process as set forth in claim 1 in which said reductive roast is effected at a temperature in the range of from about 650° C. to about 1000° C.

3. The process as set forth in claim 1 in which said leach is effected in the range of from about 85° to about 105° C.

4. The process as set forth in claim 1 in which said metal oxide is ferric oxide.

5. The process as set forth in claim 1 in which said metal oxide is vanadium pentoxide.

6. The process as set forth in claim 1 in which said metal oxide is manganese dioxide.

7. The process as set forth in claim 1 in which said hydrogen chloride source is aqueous hydrochloric acid.

8. The process as set forth in claim 1 in which a portion of said metal oxide is recycled to said precipitation zone and the remaining portion of said metal oxide is separated and recovered.

9. The process as set forth in claim 8 in which the portion of said metal oxide which is recycled to said precipitation zone is from about 50% to about 100% by weight of said titanium bearing source.

10. The process as set forth in claim 1 in which the metal portion of said metal oxide is present in said titanium bearing source and is coleached with said titanium.

11. The process as set forth in claim 1 in which said spent liquor is treated by heating said liquor in an oxidizing atmosphere.

12. The process as set forth in claim 11 in which said oxidizing atmosphere is provided by air.

13. The process as set forth in claim 11 in which said oxidizing atmosphere is provided by oxygen.

* * * * *